United States Patent
Lynch et al.

[11] 3,981,443
[45] Sept. 21, 1976

[54] CLASS OF TRANSFORM DIGITAL PROCESSORS FOR COMPRESSION OF MULTIDIMENSIONAL DATA

[75] Inventors: Robert T. Lynch; James J. Reis, both of Torrance, Calif.

[73] Assignee: Northrop Corporation, Los Angeles, Calif.

[22] Filed: Sept. 10, 1975

[21] Appl. No.: 612,090

[52] U.S. Cl. ............................................. 235/156
[51] Int. Cl.² ..................................... G06F 15/34
[58] Field of Search ............... 235/156, 152, 154; 324/77 B, 77 D, 77 G, 77 H; 340/172.5

[56] References Cited
UNITED STATES PATENTS

| | | | |
|---|---|---|---|
| 3,725,686 | 4/1973 | Ustach | 235/156 |
| 3,746,848 | 7/1973 | Clary | 235/156 |
| 3,881,100 | 4/1975 | Works et al. | 235/156 |
| 3,892,956 | 7/1975 | Fuss | 235/156 |

*Primary Examiner*—Joseph F. Ruggiero
*Attorney, Agent, or Firm*—Edward A. Sokolski

[57] ABSTRACT

A method and apparatus is presented for digitally implementing a class of transforms for the purpose of processing data in real time based on decomposing data vectors into sets of coefficients associated with matrices of transformations in the class with each transform in the class being made up of an ordered cascade of elementary transformations. Each state of the cascade is composed of the product of a weighting transformation (diagonal weighting matrix) and a generating transformation (sparse matrix composed of +1, −1, and zero elements). The inverse generating transform is obtained as the adjoint of the generating transform (transpose of the generating matrix).

The invention is implemented by cascading one or more modules composed of adder/subtractors, delays, and multipliers with all modules having the same structure and the number of modules at any stage being twice the number in the preceding stage. A class of inverse transforms is implemented using the same basic filter module structure as for the direct transforms with the number of filter modules at any stage being one half the number in the preceding stage. Any member transform in the class requires at most $2N \log_2 N$ real computations where N is the dimension of the data vector and is an integral power of two.

24 Claims, 9 Drawing Figures

FIG. 4
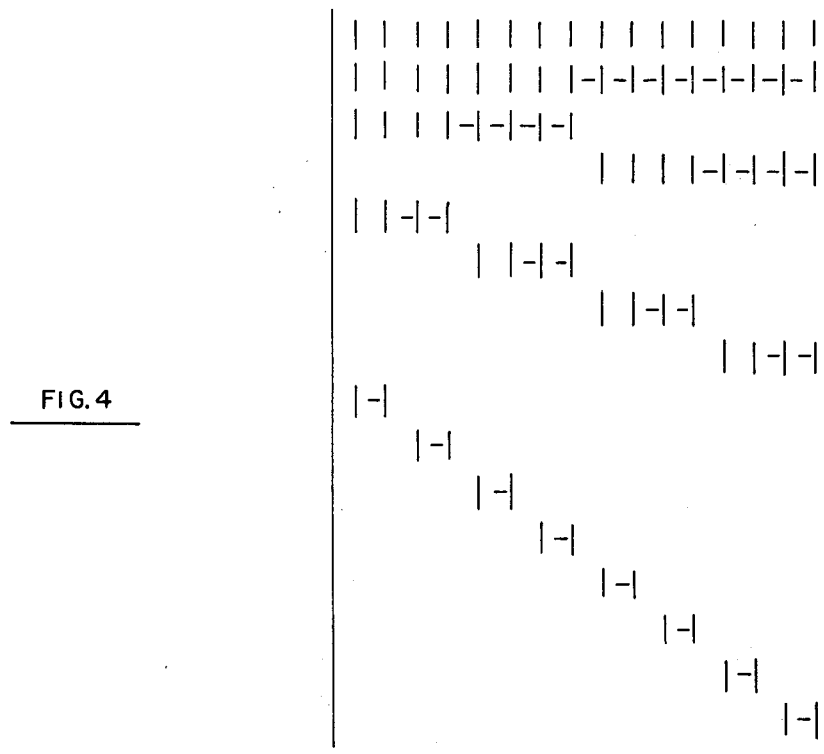
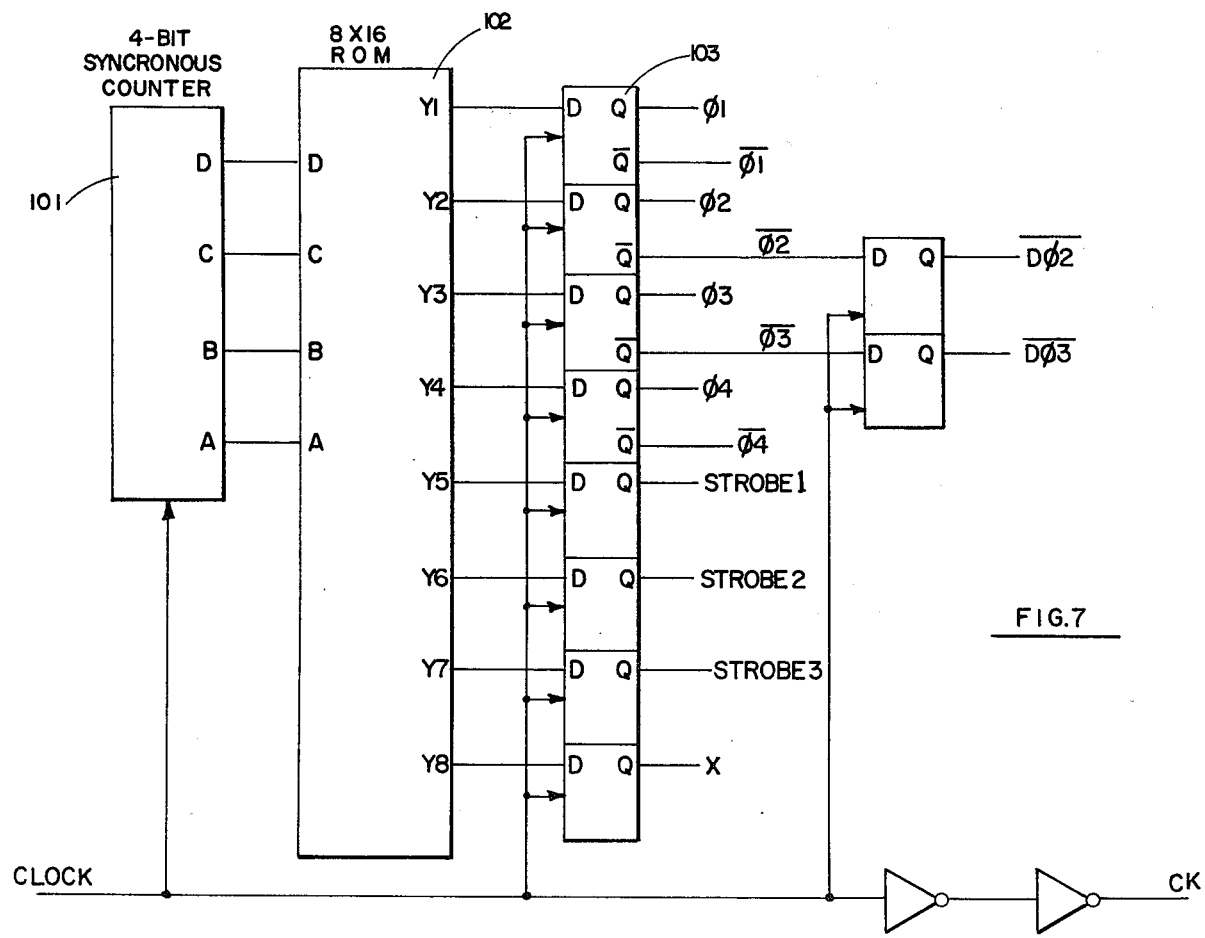
FIG. 7

FIG. 6

CLASS OF TRANSFORM DIGITAL PROCESSORS FOR COMPRESSION OF MULTIDIMENSIONAL DATA

BACKGROUND OF THE INVENTION

The present invention provides a method and apparatus for implementing a class of transforms for the purpose of processing data in real time and more particularly a method and apparatus for generating a class of transforms for the processing of data: filtering, redundancy reduction, correlation, spectral analysis, smoothing, coding, pattern recognition, multiplexing, signal characterization, signal synthesis, statistical analysis, and the like. A digital apparatus for implementing the class of transforms for real time processing of sampled data at sample rates up to 150 mega-bits per second ($1.5 \times 10^8$ B/S) is described. The class of transforms provides a way of optimizing a transform processor for a given class of data.

The current trend in information processing (computing, communications, data processing, etc.) is to digital. The reasons for the trend to digital processing are as follows:

1. Digital transmission of data minimizes the effects of channel noise.
2. Digital signals are easily and predictably regenerated.
3. Digital processor parameters are stable.
4. Errors in digital processors are easily predicted and controlled.
5. Digital processors tend to be more versatile than analog processors.
6. Digital processors can be easily interfaced with the ubiquitous digital computer.

Transformations are the foundation upon which data processing rests. Such data processing functions as signal classification, coding, redundancy reduction, etc., all involve transformations of one kind or another. The Fourier transform is an example of a well-known transform which has played a central role in filtering, spectral analysis, and pattern classification. Another example is the eigenvector, Hotelling, or Karhunen-Loeve transformation which has been extensively used for data characterization and statistical analysis. Other transforms, such as Laplace, Hilbert, Bessel, Laguere, Hermite, and Chebyshev have found wide use in all types of data analysis.

Digital implementation of any of the above-mentioned transforms requires multiplication of the input data. With the exception of the Fourier transform, all require on the order of $N^2$ computational operations for an N dimensional input data vector. These two requirements in computing these transforms require digital hardware mechanism that is relatively complex. These two requirements further require long, transform computation times.

Recently, a number of transforms have been proposed which can be computed without multiplication of the input data and which require only on the order of $N \log_2 N$ computations. Included in the group are the well known Walsh-Hadamard and Haar transforms. These transforms, being binary or tertiary in nature, are ideally suited to simple digital implementation and rapid computation. These transforms have been used for data filtering, multiplexing, redundancy reduction, signal characterization spectral analysis, pattern classification, and many other data processing operations.

SUMMARY OF THE INVENTION

The present invention provides a method and apparatus for digitally implementing a class of transforms having the following important features:

1. The class has a simple digital structure and is capable of operating at high throughput rates. The same structure exists for both the direct and inverse members of the class. The invention provides for simplified mechanization and high speed operation by using only a few logic elements such as shift registers and adder/subtractors, with the option of including multipliers. The structure of the class is built up from a plurality of identical simple modules composed of these logic elements.
2. The number of computations required to compute a member transform does not exceed $2N \log N$.
3. The options exist for generating member transforms using only add and subtract operations, as well as transforms using add, subtract, and multiply operations.
4. All currently used binary and tertiary transforms such as Walsh-Hadamard and Haar, belong to the class.

A class of transforms with the above properties provides the particularly important novel and nonobvious result that the entire class can be implemented on a single digital transform processor, which is capable of being optimized for almost any particular class of data, (e.g., landscape scenes, typewritten material, speech, radar signatures, telemetry signals, etc.) and data processing operation. Such a transform processor is capable of being implemented in simple, low cost, highly reliable digital hardware operating in real time at high throughput rates (greater than 150 mega-bits per second).

The class of transforms utilized by the present invention is defined mathematically for transforms of dimension $N = 2^M$, where $M = 1, 2, \cdots$. A member transform $T$ in the class is defined by the matrix cascade.

$$T = T_M T_{M-1} \cdots T_1,$$

where

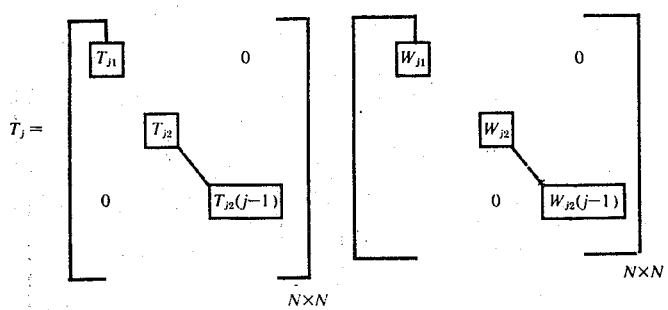

with $$T_{jk} = \begin{bmatrix} 1 & 1 & & & & & 0 \\ & 1 & 1 & & & & \\ & & 0 & \ddots & & & \\ & & & & 1 & 1 & \\ \hline 1 & -1 & & & & & \\ & 1 & -1 & & & & \\ & & 0 & \ddots & & & \\ 0 & & & & & 1 & -1 \end{bmatrix} \frac{N}{2^j} \text{ or }$$

$$\frac{N}{2^{j-1}} \times \frac{N}{2^{j-1}}$$

$$\begin{bmatrix} 1 & & & & 0 \\ & \ddots & & & \\ & & & \ddots & \\ 0 & & & & 1 \end{bmatrix}$$

$$\frac{N}{2^{j-1}} \times \frac{N}{2^{j-1}}$$

and $$W_{jk} = \begin{bmatrix} w_{j,2k-1} & & & 0 \\ & w_{j,2k} & & \\ & & \ddots & \\ & & & w_{j,2k-1} \\ 0 & & & w_{j,2k} \end{bmatrix}$$

$$\frac{N}{2^{j-1}} \times \frac{N}{2^{j-1}}.$$

$j = 1, \ldots, M, k = 1, \ldots, 2^{j-1}$.

Several important members of the class are described more fully in the following examples:

EXAMPLE 1

One member of the class is given by $M = 3$ and $N = 2^M = 8$, and $T_{jk}$ not identity matrices.

$$T_1 = \begin{bmatrix} 1 & 1 & & & & & & 0 \\ & & 1 & 1 & & & & \\ & & & & 1 & 1 & & \\ & & & & & & 1 & 1 \\ 1 & -1 & & & & & & \\ & & 1 & -1 & & & & \\ & & & & 1 & -1 & & \\ 0 & & & & & & 1 & -1 \end{bmatrix} \begin{bmatrix} w_{11} & & & & & & & \\ & w_{12} & & & & & 0 & \\ & & w_{11} & & & & & \\ & & & w_{12} & & & & \\ & & & & w_{11} & & & \\ & & & & & w_{12} & & \\ & & & & & & w_{11} & \\ & 0 & & & & & & w_{12} \end{bmatrix}$$

$$T_2 = \begin{bmatrix} 1 & 1 & 0 & 0 & & & & \\ 0 & 0 & 1 & 1 & & 0 & & \\ 1 & -1 & 0 & 0 & & & & \\ 0 & 0 & 1 & -1 & & & & \\ & & & & 1 & 1 & 0 & 0 \\ & 0 & & & 0 & 0 & 1 & 1 \\ & & & & 1 & -1 & 0 & 0 \\ & & & & 0 & 0 & 1 & -1 \end{bmatrix} \begin{bmatrix} w_{21} & & & & & & & \\ & w_{22} & & & & & & \\ & & w_{21} & & & 0 & & \\ & & & w_{22} & & & & \\ & & & & w_{23} & & & \\ & & 0 & & & w_{21} & & \\ & & & & & & w_{23} & \\ & & & & & & & w_{24} \end{bmatrix}$$

$$T_3 = \begin{bmatrix} 1 & 1 & & & & & & \\ 1 & -1 & & & 0 & & & \\ & & 1 & 1 & & & & \\ & & 1 & -1 & & & & \\ & & & & 1 & 1 & & \\ & & & & 1 & -1 & & \\ & & 0 & & & & 1 & 1 \\ & & & & & & 1 & -1 \end{bmatrix} \begin{bmatrix} w_{31} & & & & & & & \\ & w_{32} & & & & & 0 & \\ & & w_{33} & & & & & \\ & & & w_{34} & & & & \\ & & & & w_{35} & & & \\ & & & & & w_{36} & & \\ & & 0 & & & & w_{37} & \\ & & & & & & & w_{38} \end{bmatrix}$$

If all $w$'s are set to one, then $T = T_3 T_2 T_1$ is the matrix of the Walsh transform.

$$T = T_3 T_2 T_1 = \begin{bmatrix} 1 & 1 & 1 & 1 & 1 & 1 & 1 & 1 \\ 1 & 1 & 1 & 1 & -1 & -1 & -1 & -1 \\ 1 & 1 & -1 & -1 & 1 & 1 & -1 & -1 \\ 1 & 1 & -1 & -1 & -1 & -1 & 1 & 1 \\ 1 & -1 & 1 & -1 & 1 & -1 & 1 & -1 \\ 1 & -1 & 1 & -1 & -1 & 1 & -1 & 1 \\ 1 & -1 & -1 & 1 & 1 & -1 & -1 & 1 \\ 1 & -1 & -1 & 1 & -1 & 1 & 1 & -1 \end{bmatrix}$$

EXAMPLE 2

Another member of the class known as the rationalized Haar transform is generated for $M = 3$ and $N = 2^M = 8$ by making $T_{22}$, $T_{32}$, $T_{33}$, $T_{34}$ identity matrices and setting all $w$'s to one.

$$T_1 = \begin{bmatrix} 1\,1 & & & & 0 \\ & 1\,1 & & & \\ & & 1\,1 & & \\ & & & 1\,1 & \\ 1\text{-}1 & & 0 & & \\ & 1\text{-}1 & & & \\ & & 1\text{-}1 & & \\ 0 & & & & 1\text{-}1 \end{bmatrix} \begin{bmatrix} 1 & & & & \\ & 1 & & 0 & \\ & & 1 & & \\ 0 & & & 1 & \\ & & & & 1 \end{bmatrix}$$

$$T_2 = \begin{bmatrix} 1\,1\,0\,0 & & & \\ 0\,0\,1\,1 & & 0 & \\ 1\text{-}1\,0\,0 & & & \\ 0\,0\,1\text{-}1 & & & \\ & & 1 & \\ & 0 & & 1 \\ & & & 1 \end{bmatrix} \begin{bmatrix} 1 & & & \\ & 1 & & 0 \\ & & 1 & \\ & 0 & & 1 \\ & & & 1 \end{bmatrix}$$

$$T_3 = \begin{bmatrix} 1\,1 & & & \\ 1\text{-}1 & & 0 & \\ & 1 & & \\ & & 1 & \\ & & & 1 \\ 0 & & & 1 \end{bmatrix} \begin{bmatrix} 1 & & & \\ & 1 & 0 & \\ & & 1 & \\ & & & 1 \\ 0 & & & 1 \end{bmatrix}$$

$$T = T_3 T_2 T_1 \begin{bmatrix} 1\,1\,1\,1\,1\,1\,1\,1 \\ 1\,1\,1\,1\text{-}1\text{-}1\text{-}1\text{-}1 \\ 1\,1\text{-}1\text{-}1\,0\,0\,0\,0 \\ 0\,0\,0\,0\,1\,1\text{-}1\text{-}1 \\ 1\text{-}1 \quad\quad 0 \\ \quad 1\text{-}1 \\ \quad\quad 1\text{-}1 \\ 0 \quad\quad 1\text{-}1 \end{bmatrix}$$

The inverse of a member transform T in the class is given by the matrix cascade $$T^{-1} = T_1^{-1} T_2^{-1} \cdots T_M^{-1},$$

where $$T_j^{-1} = \begin{bmatrix} W_{j1}^{-1} & & & 0 \\ & W_{j2}^{-1} & & \\ & & \ddots & \\ 0 & & & W_{j2}^{-1}(j-1) \end{bmatrix}_{N \times N} \begin{bmatrix} T_{j1}^{-1} & & & 0 \\ & T_{j2}^{-1} & & \\ & & \ddots & \\ 0 & & & T_{j2}^{-1}(j-1) \end{bmatrix}_{N \times N}$$

with $$W_{jk}^{-1} = \begin{bmatrix} w_{j(2k-1)}^{-1} & & & & 0 \\ & w_{j(2k)}^{-1} & & & \\ & & \ddots & & \\ & & & w_{j(2k-1)}^{-1} & \\ 0 & & & & w_{j(2k)}^{-1} \end{bmatrix}_{\frac{N}{2^{j-1}} \times \frac{N}{2^{j-1}}}$$

and $$T_{jk}^{-1} = \tfrac{1}{2} \begin{bmatrix} 1 & & & 0 \\ 1 & & & \\ & 1 & & \\ & & \ddots & \\ 0 & & & 1 \\ & & & 1 \end{bmatrix} \begin{bmatrix} 1 & & & 0 \\ -1 & & & \\ & 1 & & \\ & -1 & & \\ & & \ddots & \\ 0 & & & 1 \\ & & & 1 \end{bmatrix}_{\frac{N}{2^{j-1}} \times \frac{N}{2^{j-1}}}$$

or

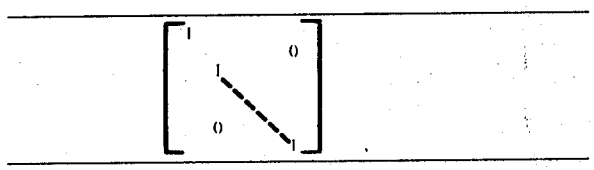

$j = 1, \cdots, M, k = 1, \cdots, 2^{j-1}.$ the data vector and N is an integral power of two. Depending on the choice of weight transformations, member transformations in the class can be orthogonal transformations.

The invention may be digitally implemented for the class of forward transforms by cascading adder/subtractor modules in stages with the number of modules in each stage being twice the number in the preceding stage. The modules all have the same structure and are constructed of adder/subtractors, delays, and multipliers. The class of inverse transforms is implemented using the same basic structure of adder/subtractor modules as is used in the class of direct transforms. The number of modules in each stage is one half the number in the preceding stage.

EXAMPLE 3

The inverse of T in Example 2 is:

$$T_1^{-1} = \tfrac{1}{2} \begin{bmatrix} 1 & & & & 0 \\ & 1 & & & \\ & & 1 & & \\ & & & \ddots & \\ 0 & & & & 1 \end{bmatrix} \begin{bmatrix} 1 & & 1 & & & & & \\ 1 & & -1 & & & & & 0 \\ & 1 & & & 1 & & & \\ & 1 & & & -1 & & & \\ & & & & & 1 & & 1 \\ & & & & & & 1 & -1 \\ 0 & & & & & 1 & & 1 \\ & & & & & & 1 & -1 \end{bmatrix}$$

$$T_2^{-1} = \begin{bmatrix} 1 & & & & 0 \\ & 1 & & & \\ & & 1 & & \\ & & & \ddots & \\ 0 & & & & 1 \end{bmatrix} \begin{bmatrix} \tfrac{1}{2}\begin{bmatrix} 1 & 0 & 1 & 0 \\ 1 & 0 & -1 & 0 \\ 0 & 1 & 0 & 1 \\ 0 & 1 & 0 & -1 \end{bmatrix} & & 0 \\ & 1 & \\ 0 & & 1 \end{bmatrix}$$

$$T_3^{-1} = \begin{bmatrix} 1 & & & & 0 \\ & 1 & & & \\ & & 1 & & \\ & & & \ddots & \\ 0 & & & & 1 \end{bmatrix} \begin{bmatrix} \tfrac{1}{2}\begin{bmatrix} 1 & 1 \\ 1 & -1 \end{bmatrix} & & 0 \\ & 1 & \\ 0 & & 1 \end{bmatrix}$$

$T^{-1} = T_1^{-1} T_2^{-1} T_3^{-1}$

The total number of transforms in the class formed from the different $T_{jk}$ matrices is $2^{2(m-1)}, M = 0, 1, 2, \cdots$ For $M = 5$, there are $2^{24} = 2^{16} = 65,536$ different space transforms in the class.

It is seen that the method of the present invention is based on decomposing data vectors into sets of coefficients associated with matrices of transformations in the class. Each transform in the class is made up of an ordered cascade of elementary transformations. Each state of the cascade is composed of the product of a weighting transformation (diagonal weighting matrix) and a generating transformation (sparse matrix composed of +1, −1, and zero elements). The inverse generating transform is obtained as the adjoint of the generating transform (transpose of the generating matrix). Any member transform in the class requires at most 2N log$_2$N real computations where N is the dimension of

BRIEF DESCRIPTION OF THE DRAWINGS

FIG. 2b shows a timing diagram for the apparatus of FIG. 2a;

FIG. 4 is the Haar transform matrix;

FIG. 6 is a detailed timing diagram for the Haar transform unit of FIG. 5;

FIG. 7 is the timing apparatus for the Haar transform unit of FIG. 5; and

DESCRIPTION OF THE PREFERRED EMBODIMENT

The Forward Transform

Figure 1:
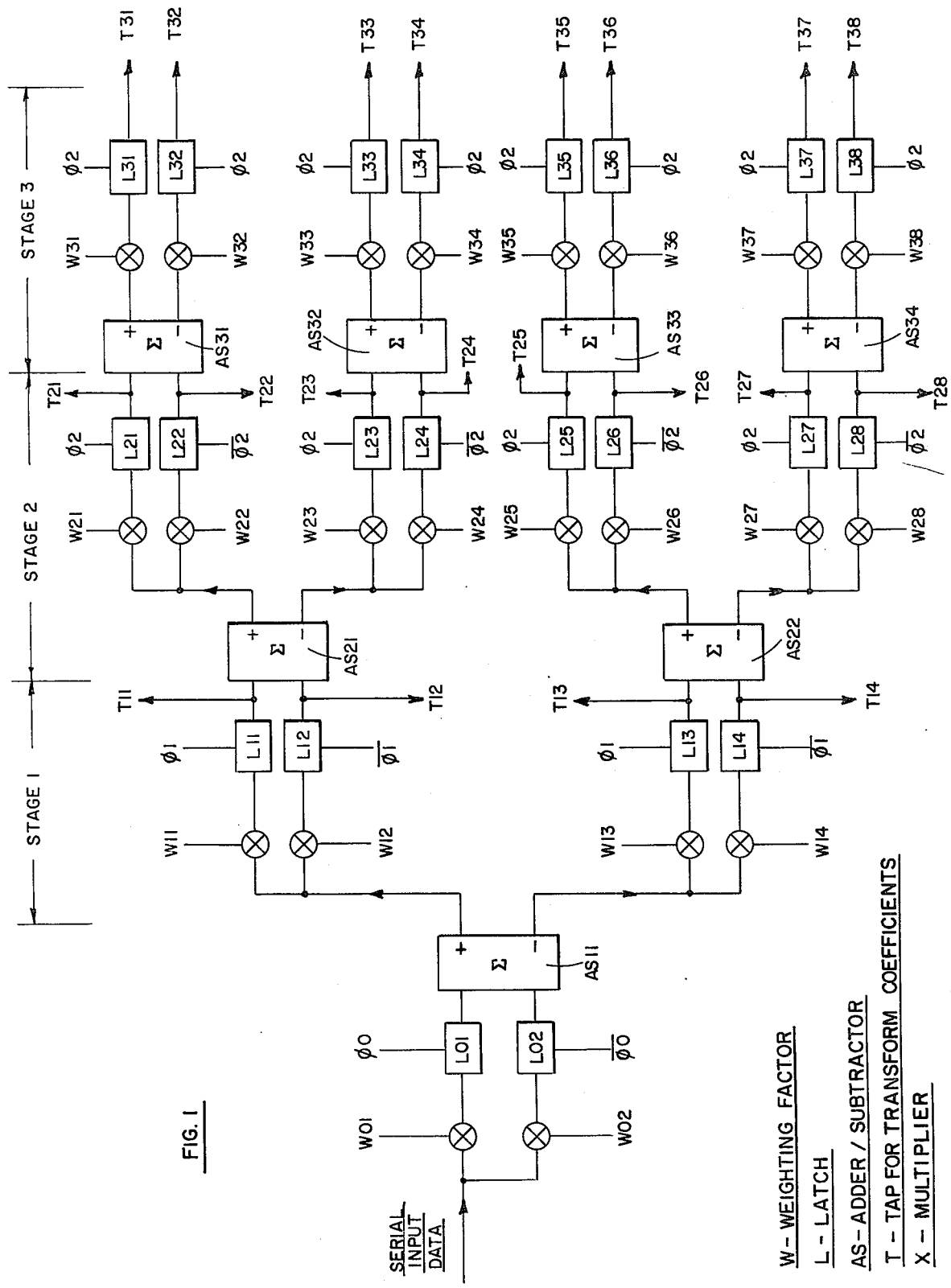
FIG. 1 shows a schematic block diagram of the apparatus of the class of transforms which is implemented by the present invention.

FIG. 1 is a schematic block diagram of a system to convert input data signals into transform coefficients in real time. The process of converting the input data signals into transform coefficients is called transformation. The system provides a plurality of adder/subtractor modules cascaded in stages with each stage having twice the number of modules as the preceding stage.

Each module includes a pair of multipliers denominated by the letter X which are operative to multiply each applied data sample by an appropriate scale factor. Each module further includes a pair of data latches denominated in FIG. 1 by the letter L. Each latch is coupled to the output of one of the associated multipliers and is formed of any suitable register for storing digital information. The data latches L are activated to receive and store data by pulse outputs denominated by $\phi$ and "$\bar{\phi}$" from a binary counter shown in FIG. 2a. The sequential counting of the binary counter is controlled by clock pulses which are synchronized with the serial application of input data to thereby synchronize the entire operation of the system, as shown in FIG. 2b.

Each module further includes an adder/subtractor denominated in FIG. 1 by AS. The adder/subtractor may be any suitable asynchronous adder. It is operative upon the suitable application of two inputs each from one of the associated latches of the module to produce two outputs; one is the sum of the contents of the two latches; the second, the difference between the contents of the two latches.

The modules are shown in FIG. 1 cascaded in stages with the first stage including the adder/subtractor AS11, the multipliers, the latches $L_{11}$ through $L_{14}$, and taps $T_{11}$ through $T_{14}$. The data extracted from the taps are transform coefficients. The modules are cascaded in FIG. 1 as shown so that each succeeding stage has twice as many modules as the preceding stage.

In the operation of FIG. 1, temporally sampled data is caused to serially enter the input part of the apparatus. The first input data sample is multiplied by the scale factor, $W_{01}$, and stored in data latch, $L_{01}$ when $\phi_0$ is a binary one. The second input data sample is multiplied by scale factor, $W_{02}$, and stored in data latch $L_{02}$ on the positive transition of $\phi_0$. Adder/subtractor, AS11, now has two valid input time samples and a meaninfgul addition and subtraction of the input signals stored in $L_{01}$ and $L_{02}$ can be performed. Adder/Subtractor, AS11, must be mechanized in such a manner as to insure the completion of the addition and subtraction process before the third input sample arrives for processing.

Figure 2A:
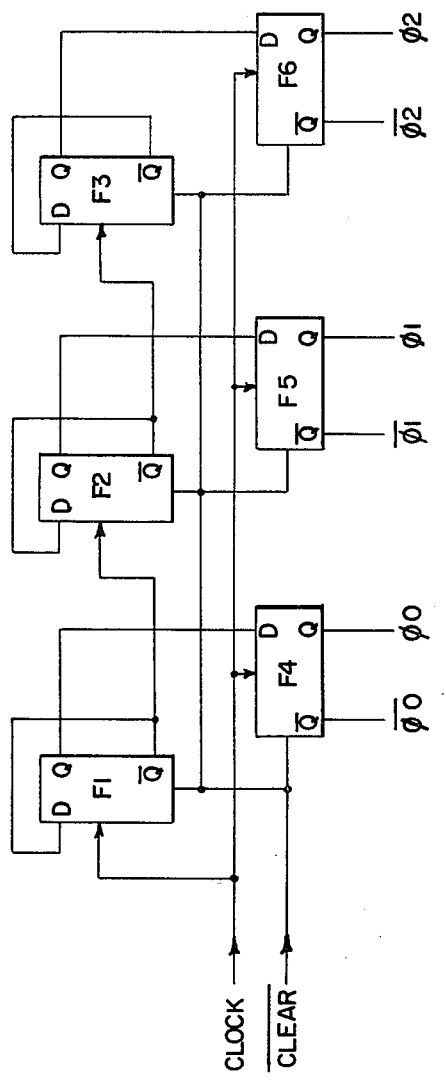
FIG. 2a shows the apparatus of a schematic block diagram of a clock generator for the class of transforms of FIG. 1.
Figure 2B:
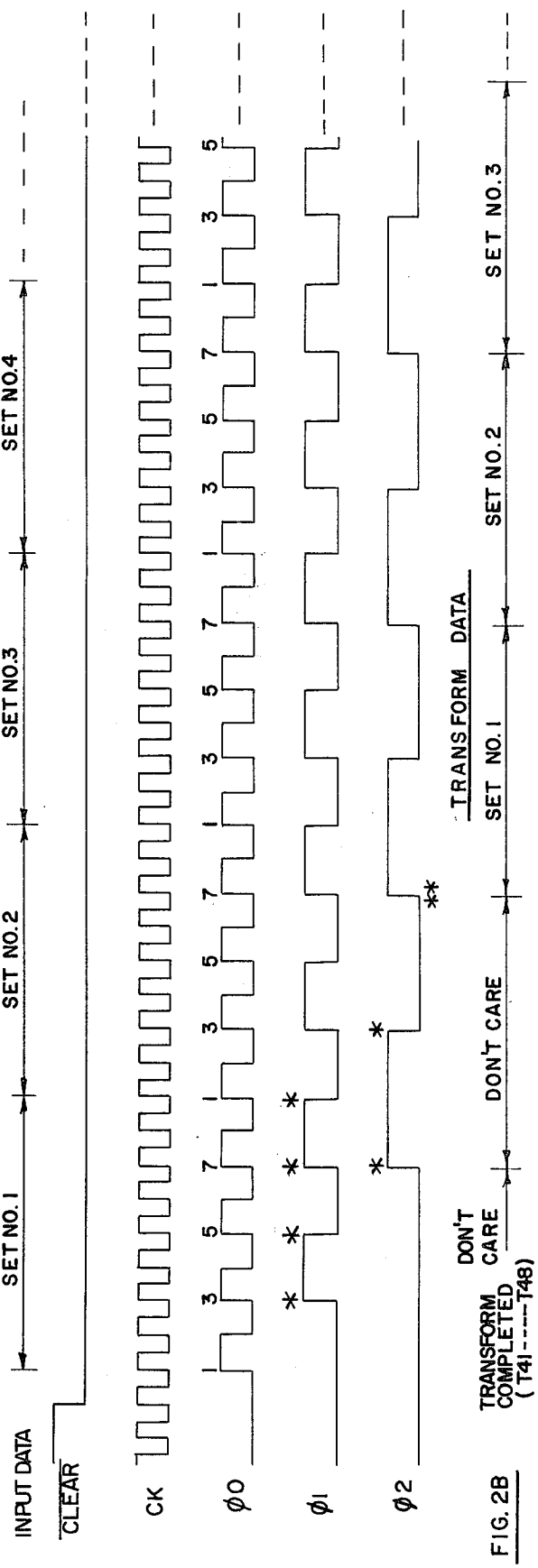

The data latches are activated by positive transitions of $\phi$ as shown in FIG. 2b from the binary counter shown in FIG. 2a. The output pulses from the binary counter activate the latches to receive and store data in synchronism with the sampled data. The binary counter is operative to generate $\phi_0$ pulses at twice the clock rate of $\phi_1$ pulses; at twice the clock rate of $\phi_2$, etc.

On the second positive transition of $\phi_0$ the first $\phi_1$ binary one pulse is generated as shown in FIG. 2b. The sum of the contents of $L_{01}$ and $L_{02}$, which was added by AS11 is multiplied by scale factor $W_{11}$ and stored in data latch $L_{11}$ on the positive transition of $\phi_1$. At the same time, the third input data sample is multiplied by scale factor $W_{01}$ and stored in data latch $L_{01}$. The fourth input data sample is multiplied by scale factor $W_{02}$ and stored in input data latch $L_{02}$ on the next positive transition of $\phi_0$. As before, AS11 once again has valid input data applied thereto from $L_{01}$ to $L_{02}$ to allow AS11 to perform its addition/subtraction function to generate the sum output $L_{01}$ plus $L_{02}$ on the add output of AS11 and the difference $L_{01}$ minus $L_{02}$ on the subtract output of AS11. The sum of $L_{01}$ and $L_{02}$ is multiplied by scale factor $W_{12}$ and stored in data latch $L_{12}$ on the positive transition of $\bar{\phi}_1$. Simultaneously, the difference $L_{01}$ minus $L_{02}$ is multiplied by scale factor $W_{14}$ and stored in data latch $L_{14}$ as the positive transition of $\bar{\phi}_1$. Adder/subtractor units AS21 and AS22 now have valid data stored in their respective input data latches and the indicated addition and subtraction can be performed.

The entire sequence of events as detailed above is repeated and extended for as many stages as desired.

The selection of a particular transform is accomplished by extracting transform coefficients generated at the various stages at the taps indicated by $T_{ij}$ where $T_{ij}$ is the $j^{th}$ tap of the $i^{th}$ stage of processing. The taps are selected in such a manner as to *once and only once* account for *all* of the input data.

The operation of the taps of FIG. 1 may be roughly analogized to a water pipeline distributing system. In this rough analogy, the taps $T_{ij}$ are analogized to water valves. As a valve is selected, it prevents the flow of water past that selected point, which precludes the use of additional valves (taps) downstream. The object is to select those combinations of valves which stop all flow. Each combination of properly selected taps represents a different member of the class of transforms.

The binary counter shown in FIG. 2a includes 6 Type D digital delay elements, each of which changes the logic level of the Q and $\bar{Q}$ outputs in response to the logic level of the D input on the positive *edge* of the input clock. Delay elements $F_1$, $F_2$ and $F_3$ are connected to form a suitable binary ripple counter to provide the $\phi$ and $\bar{\phi}$ pulses for the latches of FIG. 1. Delay elements $F_4$, $F_5$ and $F_6$ are connected to form a pulse synchronizer, which compensates for the data skewing due to the propagation delay of the ripple counter. The use of the delay elements is optional in low speed applications. The timing diagram in FIG. 2a shows the waveforms generated at the Q output of $F_4$, $F_5$ and $F_6$.

FIG. 2b shows the timing of the clock generator of FIG. 2a to control the apparatus of FIG. 1 to produce an eight point transform. The asterisks show when valid transform coefficients can be extracted from the various taps of the class of transform apparatus of FIG. 1. Those asterisks associated with $\phi 1$ are for transform coefficients obtained from taps selected in stage 1, i.e., $T_{ij}$. The asterisks associated with $\phi 2$ are for transform coefficients obtained from taps selected in stage 2, i.e. $T_{2j}$. The double asterisk associated with $\phi 2$ represents the point when transform coefficients first become available in stage 3, i.e., $T_{3j}$. Thus it is seen that the transform coefficients are produced in real time after a predetermined delay as shown in FIG. 2b.

A quick inspection of the apparatus of FIG. 1 and the timing diagrams of FIG. 2b shows that the last stage of processing (i.e., stage 3 in FIG. 1) is not clocked by a $\phi 3$, as would be required if there were four or more stages of processing, but rather it is clocked by $\phi 2$. This was done to simplify mechanization of the clock generating apparatus of FIG. 2a. By clocking the stage 3 storage latches, $L_{3j}$, with $\phi 2$ instead of $\phi 3$, one complete ripple counter stage and pulse synchronizer stage may be eliminated.

THE INVERSE TRANSFORM

Figure 3:
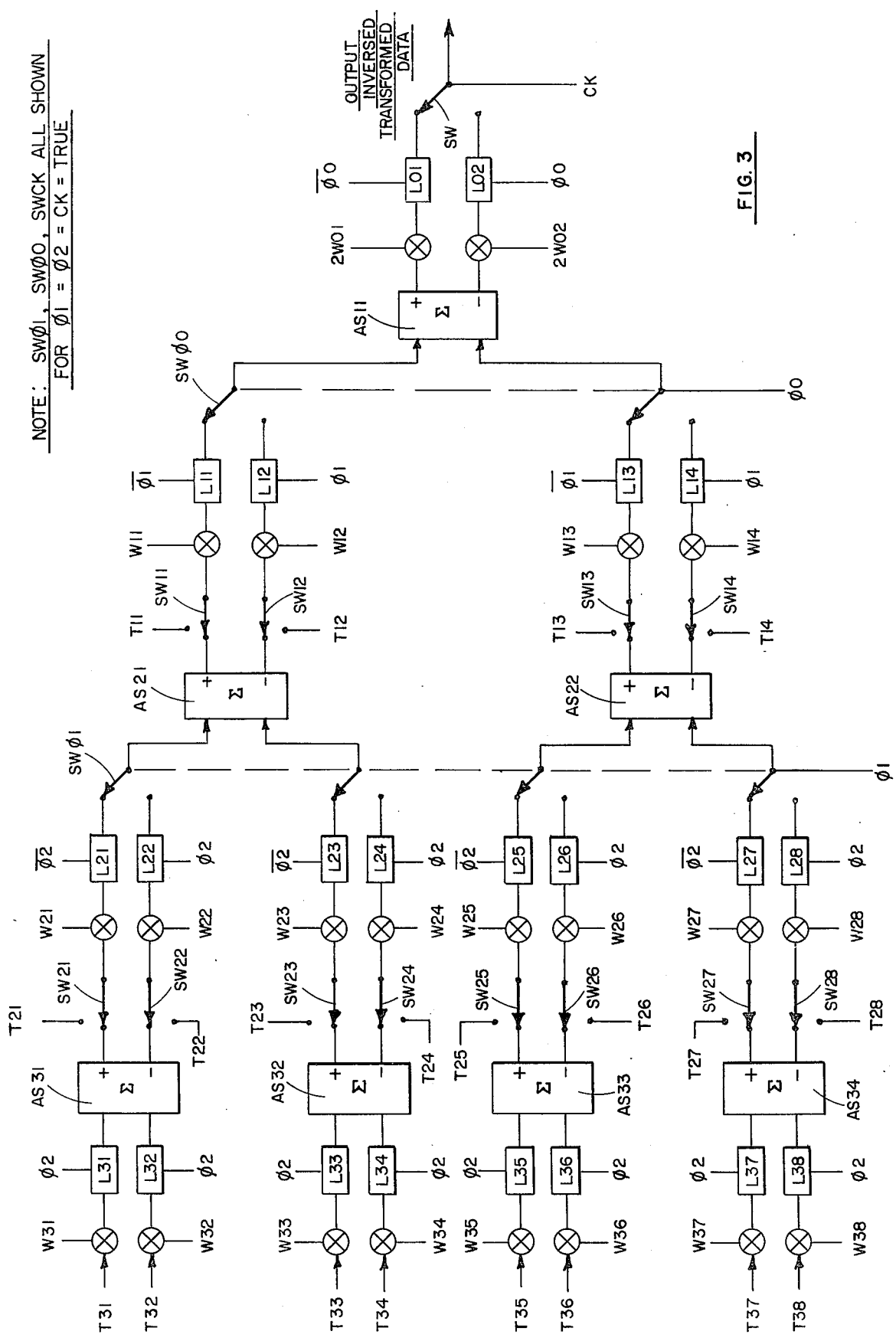
FIG. 3 is a schematic block diagram of the apparatus for realizing the inverse class of transforms which is implemented by the present invention.

The process of converting transform coefficients back into (input) data samples is called *inverse transformation*. FIG. 3 shows how the inverse transformations are realized. Its operation is similar to that of the forward transformation apparatus of FIG. 1 with the signal flows being reversed. In the forward transform, the transform coefficients are obtained by adding and subtracting the input data signals. Therefore, the inverse transform must be normalized by a factor of two. To achieve this, the scale factors are replaced by one-half of their corresponding reciprocals.

Data is applied to the inverse transform in parallel order at a relatively slow rate (at the end of each transformation), and is transmitted continuously at the output of the inverse transform in serial order at a relatively high rate. Each transform requires a predetermined number of clock pulses.

Switches $SW\phi$ are ganged as shown and are clocked to select the appropriate data from each stage at the appropriate time to be processed by the next stage. Since each stage has a number of adder/subtractor units operating in parallel, the outputs of each stage are transmitted in parallel. The switches $SW\phi$ thereby integrate or reduce the data from the one stage to the next succeeding stage.

The switches $SW_{ij}$ are input selector switches and are positioned according to the taps and correspondingly to the particular transform selected during the forward transformation process. By way of example, if the selector switches are set as shown in FIG. 3, the inverse transform would proceed as follows: The clock generating apparatus for the class of transforms and the timing diagram as shown in FIG. 2b are applicable to the Inverse Class of Transforms. The first six clock pulses of the clock generating apparatus cause no meaningful operation of the Inverse Class of Transforms as shown in FIG. 3. These six pulses merely initialize the clock generating apparatus. On the first positive transition of $\phi 2$ those transform coefficients which were derived from the $T_{3j}$ taps in the forward Class of Transforms, FIG. 1, are multiplied by the appropriate weight, $W_{3j}$, and stored in the appropriate data latch, $L_{3j}$. The clock generation continues to cycle until the next positive transition of $\bar{\phi}2$ wherein the weighted sums of the $L_{3j}$ data latches are multiplied by the appropriate weights of the second stage, $W_{2j}$, and stored in the odd numbered stage 2 data latches, $L_{2j}$.

The data switches $SW\phi$ are shown ganged together. As shown in the forward transform in FIG. 1, data is shown latched to either even latches or odd latches in any one module. Therefore in the inverse transform, the switches $SW\phi$ are ganged to transmit data from either odd or even latches of any module.

Data switch $SW\phi 1$ is shown connected to the odd numbered data latches, $L_{2j}$, which allows the second stage Adder/Subtractor Units AS21 and AS22 to perform valid additions and subtractions. The clock generator continues to cycle until the negative transistion of $\phi_1$ (positive transition of $\bar{\phi}_1$) wherein the *weighted sums* of the *odd* numbered $L_{2j}$ data latches are multiplied by the appropriate weights $W_{ij}$ and are stored in the *odd* numbered data latches $L_{1j}$.

Data Switch $SW\phi_0$ is shown connected to the odd numbered data latches, $L_{1j}$, which allows the first state Adder/Subtractor Unit to perform a valid addition and subtraction. The clock generator continues to cycle until the next negative transition of $\phi_0$ (positive transition of $\bar{\phi}_0$), wherein the weighted sum of the odd $L_{1j}$ latches are multiplied by the appropriate weights $W_{02}$ and stored in the odd numbered data latch $L_{01}$. Switch SWCK is now connected to data latch $L_{01}$, which now contains the first recovered inversed transformed data point. The next positive transition of $\phi_0$ is also the next positive transition of $\phi 1$ and $\phi 2$.

The data switches SWCK, $SW\phi 0$, and $SW\phi 1$ may be switched to contact the even positions. The *even* data latches of the respective stages $L_{0j}$, $L_{1j}$ and $L_{2j}$ store weighted difference data from its corresponding preceding stage and the $L_{3j}$ data latches store a new set of transform coefficients. The data is further processed according to FIG. 3 and timing diagram 2b in analagous fashion as previously described.

SPECIAL CASES OF IMPORTANCE

1. A special case of importance of the embodiment of FIG. 1 is that case wherein all the multiplication scale factors, $W_{ij}$, are limited to powers of two, i.e., $W = 2^k$, $k = 1, 2 \ldots$. This case leads to an especially economical hardware implementation, since the multiplication blocks can be replaced by a hard wired shifting of the binary point.

2. If the ultimate in operating speed is not required, then some economy of hardware can be gained by eliminating all of the even numbered data latches, except for those output stages being tapped.

Figure 5:
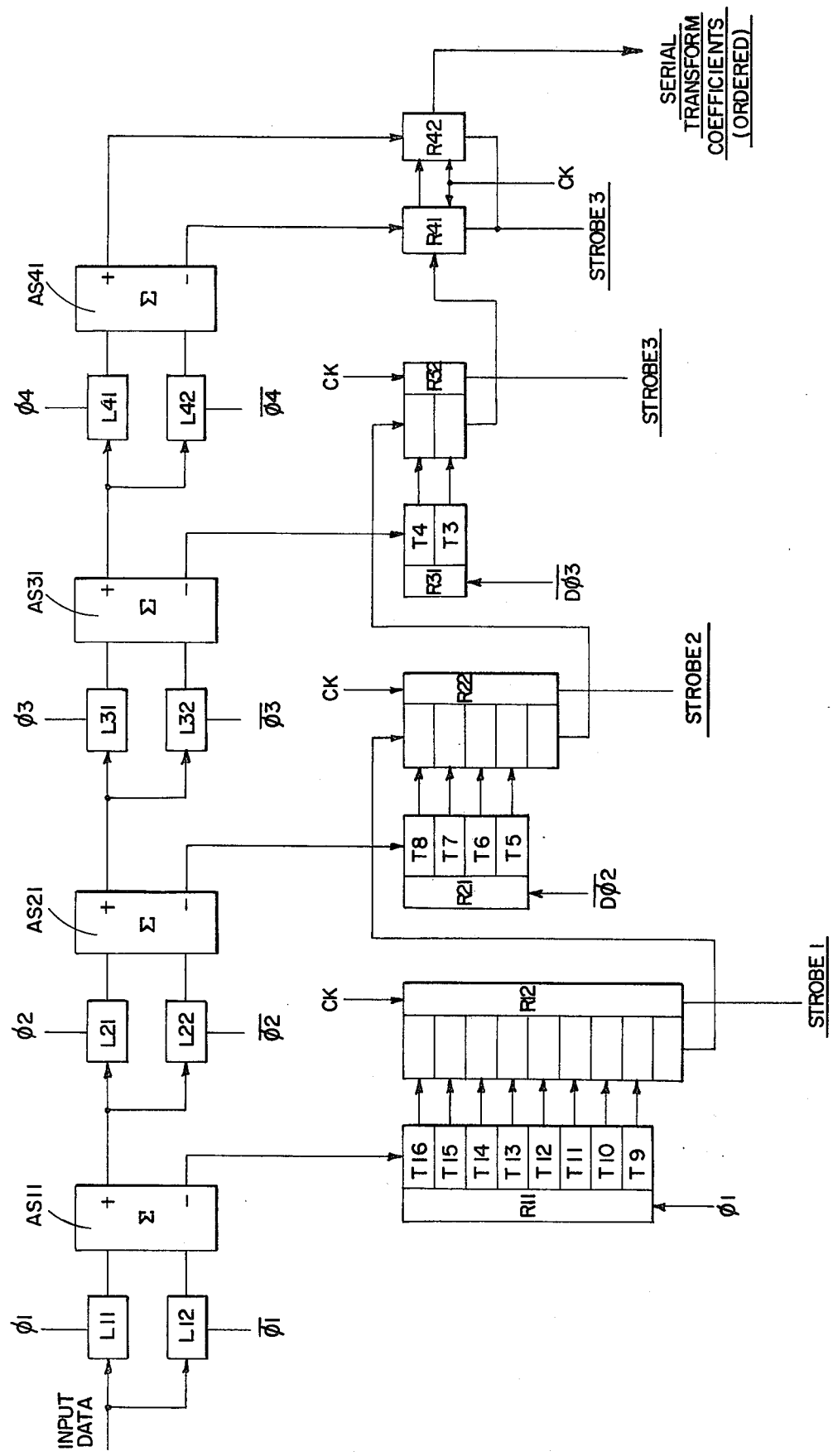
FIG. 5 is the schematic block diagram of apparatus for obtaining the rationalized Haar transforms of FIG. 4 with provisions for outputting ordered serial transform coefficients.

3. The Haar Transform: The simplest transform to mechanize is the rationalized Haar transform, which in matrix form is shown in FIG. 4. The Class of Transforms of FIG. 1, reduces to the rationalized Haar Transform as shown in FIG. 5. A four stage 16 point Haar transform unit based upon FIG. 5 has been constructed and operated at input data sample rates in excess of 8 MHZ 4 or 8 bits/sample which equals 64 in BPS throughput rate. By comparing FIG. 5 with FIG. 1, it is possible to summarize the functioning of the Haar transformer apparatus as outputting the differences from the adder/subtractor unit as transform coefficients and propagating the sum terms for additional processing. The apparatus of FIG. 5 has provisions through registers R11, R12, R21, R22, R31, R32, R41 and R42 for outputting transform coefficients in an *ordered serial fashion* as shown in the matrix of FIG. 4. This feature was included to illustrate the simplicity of generating a *serial* stream which is useful in most forms of processing.

DETAILED OPERATION OF THE HAAR TRANSFORM UNIT

The clocking of the apparatus of FIG. 5 is somewhat complicated by the additional circuitry which provides for outputting the Haar transform coefficients in *serial ordered* form. The required timing and control can be implemented with hard-wired logic, but the current state-of-the art in digital read only memories (ROM) makes it more economical to use an ROM to generate most of the required clocking signals. When such as ROM is used, a timing apparatus such as that shown in FIG. 7 is required.

Figure 6:
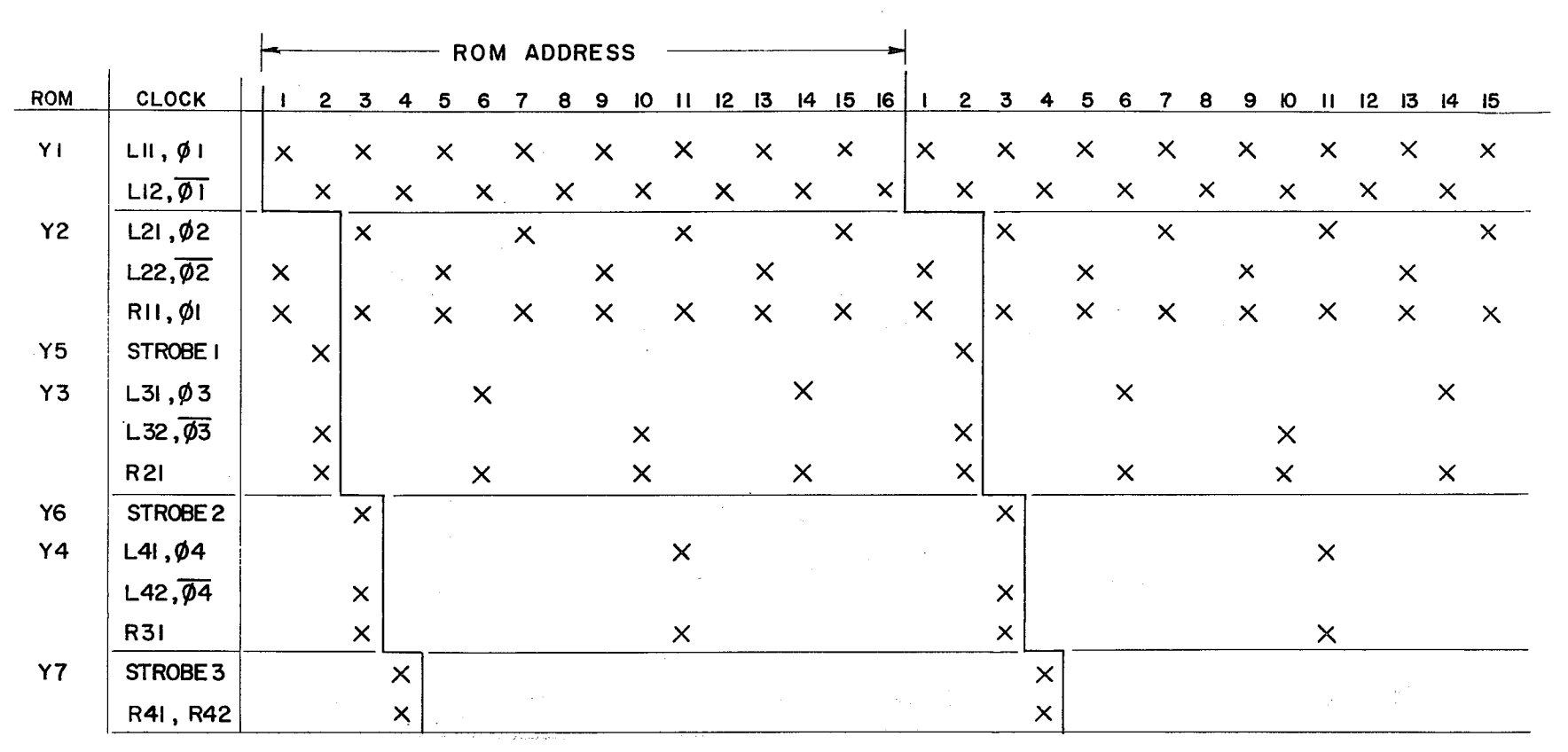

In the operation of the apparatus of FIG. 7, a 4-bit synchronous counter 101 is caused to increment its count on the positive transitions of the input clock pulses. The input pulses are usually provided by a crystal oscillator. The frequency of the input clock pulses is selected to be numerically equal to the desired input data sample rate. The ROM 102 is programmed according to the timing diagram in FIG. 6, wherein an X in FIG. 6 means: store a *true* logic level (+1) at the indicated address and bit position; in the absence of an X, store a *false* logic level (0) at the indicated address and bit position. In response to the binary address provided by the 4-bit counter, the ROM 102 produces the required bit pattern which in turn is stored in a holding register 103 on the next positive transition of the clock signal. Signals $D\bar{\phi}_2$ and $D\bar{\phi}_3$ are one pulse time delayed replica of $\bar{\phi}_2$ and $\bar{\phi}_3$ respectively, as required by the apparatus of FIG. 5. Signal CK is a propagation delay compensated replica of CLOCK pulse as required by the apparatus of FIG. 5.

The Haar transform unit of FIG. 5 operates as follows: Temporally sampled input data is caused to serially enter the input of the apparatus of FIG. 5.

Clock 1: L11 stores 1st data sample.

Clock 2: L12 stores 2nd data sample. AS11 adds and subtracts L11 and L12.

Clock 3: (L11) − (L12) is shifted into Register R11, (L11) + (L12) is stored in L21, L11 stores 3rd data sample.

Clock 4: L12 stores 4th data sample, AS11 adds and subtracts L11, L12,

Clock 5: (L11) − (L12) is shifted into Register R11, (L11) + (L12) is stored into L22, AS21 adds and subtracts L21, L22. L11 stores 5th data sample.

Clock 6: (L21) + (L22) is stored in L31, (L21) − (L22) is shifted into Register R21, (L12 stores 6th data sample, AS11 adds and subtracts L11, L12.

Clock 7: (L11) − (L12) is shifted into R11, (L11) + (L12) is stored in L21, L11 stores 7th data sample.

Clock 8: L12 stores 8th data sample, AS11 adds and subtracts L11, L12.

Clock 9: (L11 − L12) is shifted into Register R11, (L11 + L12) is stored into L22, A21, adds and subtracts L21, L22. L11 stores 9th data sample.

Clock 10: L21) − (L22) is shifted into R21, (L21) + (L22) is stored into L32, L12 stores data sample 10.

Clock 11: (L11) − (L12) is shifted into R11, (L11) + (L12) is stored into L21. (L31) + (L32) is stored into L41, (L31) − (L32) is shifted into R31, L11 stores the 11th data sample.

Clock 12: L12 stores 12th data sample.

Clock 13: (L11) + (L12) is stored into L22, (L11 − (L12) is shifted into R11, L11 stores 13th data sample.

Clock 14: (L21) + (L22) is stored in L31, (L21) − (L22) is shifted into R21, L12 stores 14th data sample.

Clock 15: (L11) + (L12) is stored in L21, (L11) − (L12) is shifted into R11, L11 stores 15th data sample.

Clock 16: L12 stores 16th data sample.

NOTE: At this point, the last input data sample has just entered the transform unit for a 16 point transform. Subsequent data marks the beginning of a new transform period. Due to the pipeline approach, the transform of the first 16 data samples is not yet complete.

Clock 17: (L11) + (L12) is stored in L22, (L11) − (L12) is shifted into R11, L11 stores 1st data sample of 2nd transform time.

Clock 18: L12 stores 2nd data sample of 2nd transform time. Strobe 1 causes the contents of R11 to be copied in parallel into Registor R12. (Register R12 now contains the last 8 Haar transform coefficients). (L21) + (L22) is stored into L32, (L21) − (L22) is shifted into R21.

Clock 19: (L11) + (L12) is stored into L21, (L12) is shifted into R11. (L11 stores 3rd data sample of 2nd transform time. R12 shifts (down) 1 place. Strobe 2 causes R21 to be copied into R22, (L31) + (L32) is stored into L42, (L31) − (L32) is shifted into R31, Clock 20: R12 and R22 shift (down) 1 place. Strobe 3 causes R31 to be copied into R32. Strobe 3 also stores (L41) + (L42) into R41. Strobe 3 also stores (L41) − (L42) into R42. L12 stores 4th data sample of 2nd transforms time.

NOTE: The first 16 data samples are now completely transformed and converted into an ordered serial stream of transform coefficients. The R12, R22, R32, R42, R41 registers continue to shift the transform coefficients one place for every additional clock pulse. The entire sequence continues as outlined above.

INVERSE HAAR TRANSFORM UNIT

Figure 8:
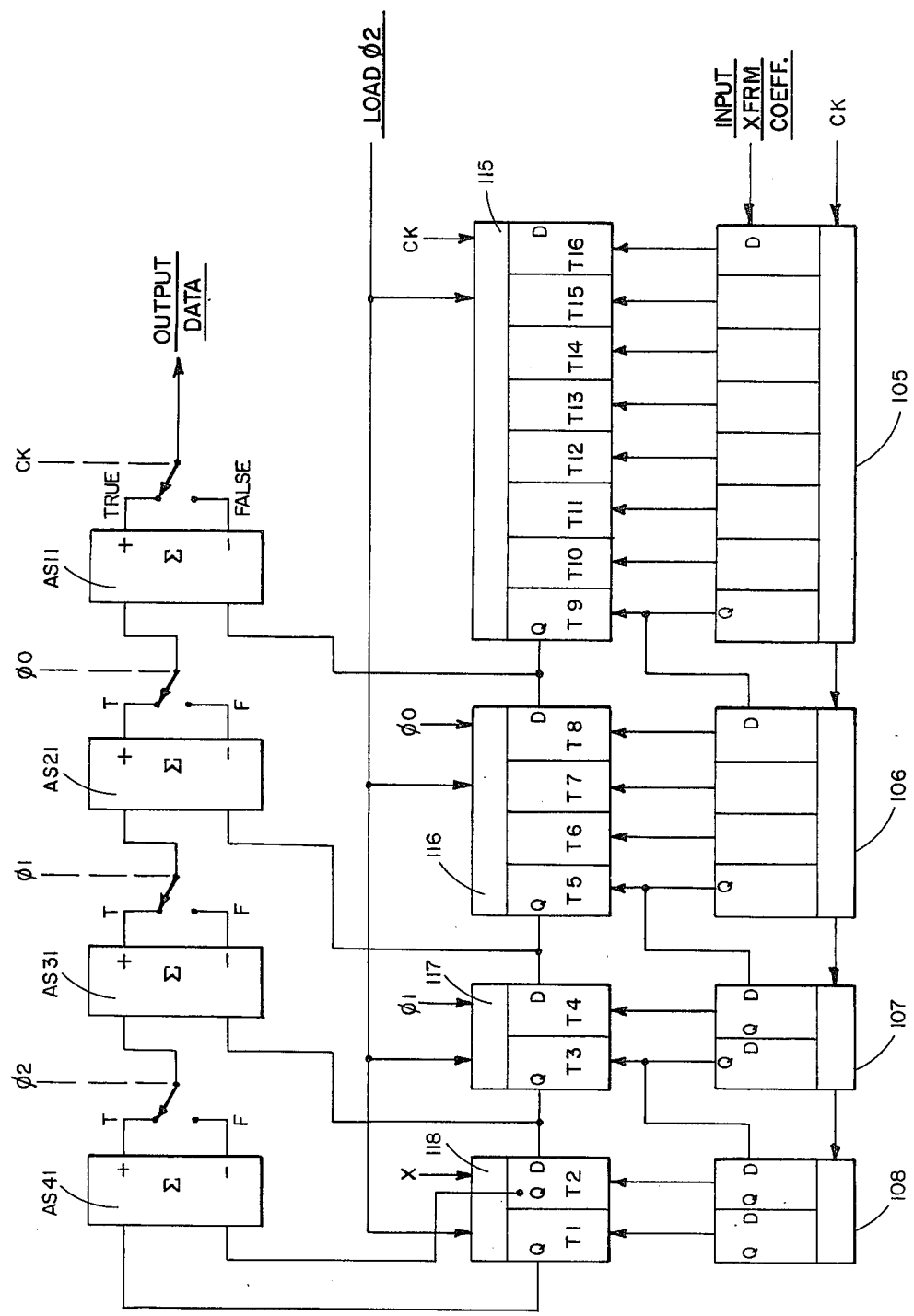
FIG. 8 is the schematic block diagram of the apparatus for realizing inverse Haar transform.

An inverse Haar Transform Unit is shown in FIG. 8. Clocking signals are generated by the apparatus of FIG. 2a. Transform coefficients serially enter the serial-to-parallel shift registers 105 through 108 of FIG. 8. After all 16 transform coefficients are contained within the serial-to-parallel registers, the load control for the parallel-to-serial shift registers 115 through 118 is pulsed, which causes the data in the serial-to-parallel registers to be copied into the parallel-to-serial registers on the leading (positive) *edge* of $\phi2$. This copying process is referred to as "double buffering" in the state of the art, and its use here allows transform data to be continually shifted into the serial-to-parallel register for continuous real-time processing. The timing diagram as shown in FIG. 2b starts yielding proper clock pulse signals for the Inverse Haar Apparatus of FIG. 8 at the first positive transition of $\phi_2$. The first "DON'T CARE" interval corresponds to the 16 clock pulses needed to clock input transform coefficients into the serial-to-parallel registors of FIG. 8. Adder/Subtractor units AS11 through AS41 are assumed to have neglible propagation delay with respect to the maximum clocking frequency, CK.

The detailed operation of the inverse Haar Transform Unit is similar to the inverse class of transforms. During the first true time of CK, the output data is seen to be $((((T_1 + T_2)/2 + T_3)/2 + T_5)/2 + T_9)/2 =$ No. 1 recovered time sample. During the first false time of CK, the output is seen to be: $((((T_1 + T_2)/2 + T_3)/2 + T_5)/2 − T_9)/2 =$ No. 2 recovered time sample. By shifting the data and selecting the appropriate switch settings as shown in FIG 2a, all of the time samples are recovered. Those skilled in the art will recognize immediately that for those applications where the propagation delays of the adder/subtractor units cannot be ignored, it is a simple matter to insert clocked latches between processing stages and to adjust the clocking to achieve the required signal processing.

We claim:

1. A system for digitally implementing a class of transforms to process data in real time comprising, a plurality of modules cascaded in stages with each stage having twice the number of modules as the preceding stage, each of said modules including a pair of latches for receiving and temporarily storing data from the preceding module, and an adder/subtractor unit having two units with each input coupled to the output of one of the associated pair of data latches, said adder/subtractor unit having a pair of outputs for providing a first output signal corresponding to the sum of the contents of the pair of associated data latches and a second output signal corresponding to the difference of the contents of the associated pair of data latches, and means for coupling said first and second output signals of each adder/subtractor unit to one of the two associated modules of the next succeeding stage to thereby implement the class of transformers in real time.

2. The system as described in claim 1 and wherein each of said modules includes a pair of multipliers with each multiplier coupled between one of the outputs of the associated adder/subtractor unit of the next preceding stage and one of the pair of data latches of the associated module to provide a weighting factor.

3. The system as described in claim 1 and further including a plurality of taps with each tap coupled to the output of one of said data latches to provide transform coefficients of a member of the class of transforms to thereby implement the class of transforms.

4. The system as described in claim 1 and further including timing means coupled to each of said data latches to control the temporary storage of data in each of said data latches.

5. The system as described in claim 1 and wherein data is serially fed to said system and further including timing means coupled to each of said data latches to control the temporary storage of data in each of said data latches in synchronism with the serial feeding of data to said system.

6. The system as described in claim 5 and wherein said timing means includes a binary ripple counter and a plurality of delay elements each coupled to said binary ripple counter, said delay elements coupled to compensate for data skewing due to the propagation delay of said ripple counter.

7. A system for providing inverse transformation by converting transform coefficients to data samples in real time comprising, a plurality of modules cascaded in stages with each stage having a number of modules equal to or greater than the number of modules in the next succeeding stage, each of said modules including a plurality of data latches for receiving and temporarily storing data from the preceding module, and an adder/subtractor unit having two inputs with each input selectively coupled to the outputs of a pair of the associated plurality of data latches, said adder/subtractor unit having a pair of outputs for providing a first output signal corresponding to the sum of the contents of the pair of data latches coupled thereto and a second output signal corresponding to the difference between the contents of the pair of data latches coupled thereto, and means for coupling said first and second output signals of said adder/subtractor to one of said plurality of data latches in the next succeeding stage.

8. The system as described in claim 7 and further including a plurality of data switches each coupled between the outputs of at least several of said plurality of data latches and the output of the associated adder/subtractor to transmit data from either odd or even latches at any given point of time.

9. The system as described in claim 8 and wherein said data switches are ganged together.

10. The system as described in claim 7 and further including a plurality of multipliers each coupled to the input of one of said data latches for normalizing the input by a factor of two.

11. The system as described in claim 7 and wherein said transform coefficients were developed from a forward transformation and further including, a plurality of selector switches each coupled to one output of several of said adder/subtractor units with each of said selector switches positioned according to the corresponding transform developed during the forward transformation.

12. The system as described in claim 11 and further including a plurality of multipliers each coupled to the input of one of said data latches for providing a weighting factor which is one-half of the corresponding reciprocal in the forward transformation.

13. A system for providing an ordered serial stream of transform coefficients in the real time comprising, a plurality of modules coupled in series for generating transform coefficients, each of said modules including a pair of data latches and an adder/subtractor unit with the output of each data latch in each of said pair of data latches coupled to one of the inputs of the associated adder/subtractor unit, a plurality of shift registers each coupled to one of said modules for receiving and temporarily storing said transform coefficients, and a plurality of parallel-to-serial registers each coupled to the output of one of said plurality of shift registers for providing said serial stream of transform coefficients.

14. The system as described in claim 13 and further including a read only memory coupled to said plurality of modules, said plurality of shift registers, and said plurality of parallel-to-serial registers for synchronizing the operation of said modules with the operation of said plurality of shift registers and said plurality of parallel-to-serial registers.

15. The system as described in claim 13 and wherein said data latches each include a binary shift register.

16. A system for providing a serial stream of rationalized Haar transform coefficients in real time including a plurality of modules coupled in series with each of said modules comprising, a pair of binary shift registers, an adder/subtractor unit having a pair of inputs with each input coupled to one output of one of the associated pairs of binary shift registers, said adder/subtractor unit having a first add output and a second subtract output with one of said first and second outputs coupled to the pair of binary shift registers in the next succeeding stage and the other of said first and second outputs operative to generate a transform coefficient.

17. The system as described in claim 16 and further including a read only memory coupled to each of said plurality of modules for synchronizing the operation of each of said modules.

18. The system as described in claim 16 and further including a plurality of registers each coupled to one of said plurality of modules for converting said transform coefficients to a serial stream.

19. The system as described in claim 18 and further including a read only memory coupled to each of said plurality of modules and each of said plurality of registers for synchronizing the operation of said plurality of modules with said registers.

20. A system for converting rationalized Haar transform coefficients to data coefficients in real time comprising,
a plurality of registers for receiving said transform coefficients, and
a plurality of adder/subtractor units coupled serially in stages with each having at least one input coupled to at least one of said plurality of registers and each of said adder/subtractor units except the one associated with the first stage having a second input operatively coupled to the output of the adder/subtractor unit of the next preceding stage with the adder/subtractor unit associated with the first stage having a second input operatively coupled to one of said plurality of registers,
said adder/subtractor units each having an add output and subtract output whereby the rationalized Haar transform coefficients are transmitted serially from the output of the last adder/subtractor unit of said adder/subtractor units coupled serially in stages.

21. The system as described in claim 20 and wherein each of said adder/subtractor units includes a binary shift register for dividing the input data by two.

22. The system as described in claim 21 and further including a plurality of switches each coupling said second input of each of said adder/subtractor units selectively to the add output or the subtract output of the adder/subtractor unit of the next preceding stage, thereby converting all of said transform coefficients to data coefficients.

23. The system as described in claim 20 and wherein said plurality of registers includes a first plurality of serial-to-parallel shift registers for receiving and temporarily storing the transform coefficients.

24. The system as described in claim 23 and wherein said plurality of registers further includes a second plurality of parallel-to-serial shift registers each having inputs coupled to the outputs of one of said first plurality of serial-to-parallel shift registers to provide double buffering to thereby enable transform coefficients to be continually shifted into said first plurality of serial-to-parallel shift registers to provide conversion of rationalized Haar transform coefficients to data coefficients in real time.

* * * * *